July 26, 1966

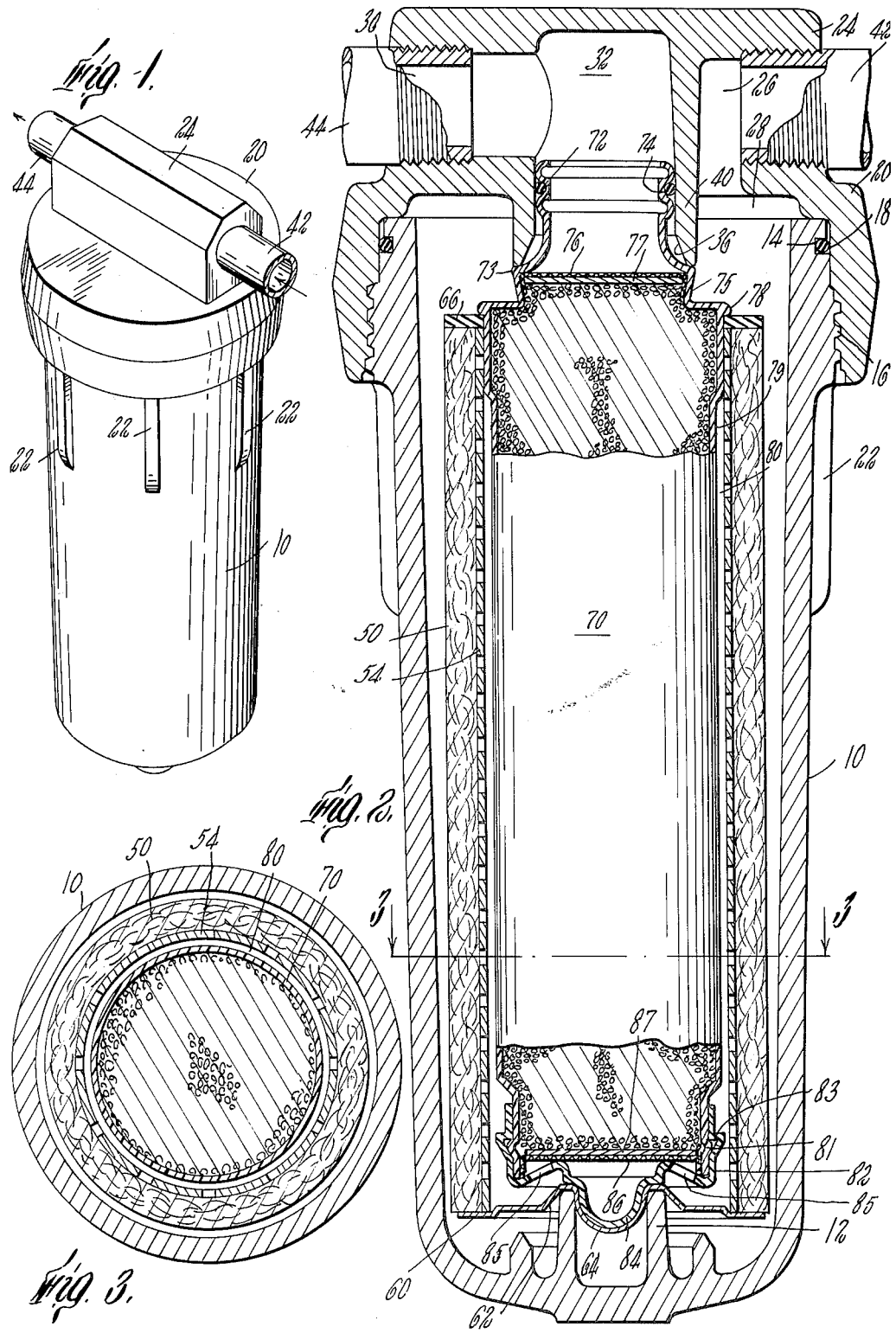

A. R. GAILITIS ETAL  3,262,570

FILTRATION ASSEMBLIES AND REPLACEABLE
ELEMENTS OF SUCH ASSEMBLIES

Filed Feb. 5, 1963

United States Patent Office 3,262,570
Patented July 26, 1966

3,262,570
FILTRATION ASSEMBLIES AND REPLACEABLE
ELEMENTS OF SUCH ASSEMBLIES
Adolph R. Gailitis, Winchester, Jiulio C. Borsetti, Beverly, and Franz Rosenbaum, Malden, Mass., assignors to Commercial Filter Corporation, Melrose, Mass., a corporation of Massachusetts
Filed Feb. 5, 1963, Ser. No. 256,390
1 Claim. (Cl. 210—266)

This invention relates to filtration and fluid purification and more particularly to filtration apparatus having provision for combined filtration and purification of liquids and/or gaseous substances.

A main object of the invention is to provide apparatus so constructed that the active filtration and purification components are individually and separately readily removable from the apparatus for separate disposal and easy replacement, all providing, in the act of assembly of the components, suitable positioning and sealing means for insuring proper control and proper flow therethrough of a fluid fed thereinto.

Essentially, apparatus of the invention is constituted of three major components—an open-ended container, a separable head or cap, and a dual filter element assembly comprising an outer radial passage filter unit and an inner axial passage purifier unit, all of which are assembled and held in proper spaced relation to one another to provide the proper fluid channels merely by telescoping the two filter elements together, placing them as an assembly within the container and then hand applying the container to the cap as by screwing the container into the cap, all without the necessity of making any permanent mechanical connections beyond the frictional fit between cooperating surfaces provided on the various components.

The apparatus hence provides a compact, relatively inexpensive, readily cleaned and maintained apparatus in which the separate filtration and purification elements may be individually removed and renewed as occasioned by their possibly differing useful lives under varying service conditions.

One feature of the invention is that a large proportion of the parts can be formed from plastic materials which are either injection molded or blown, thus minimizing the necessity for the heavier metal components usually found in filtration units.

The assembled filtration unit is shown in the accompanying drawings wherein:

FIG. 1 is a perspective view of the complete unit with pipe leads broken away;

FIG. 2 is a vertical cross-sectional enlarged view of the apparatus of FIG. 1;

FIG. 3 is a cross-sectional view taken along the line 3—3 of FIG. 2;

Figure 4:
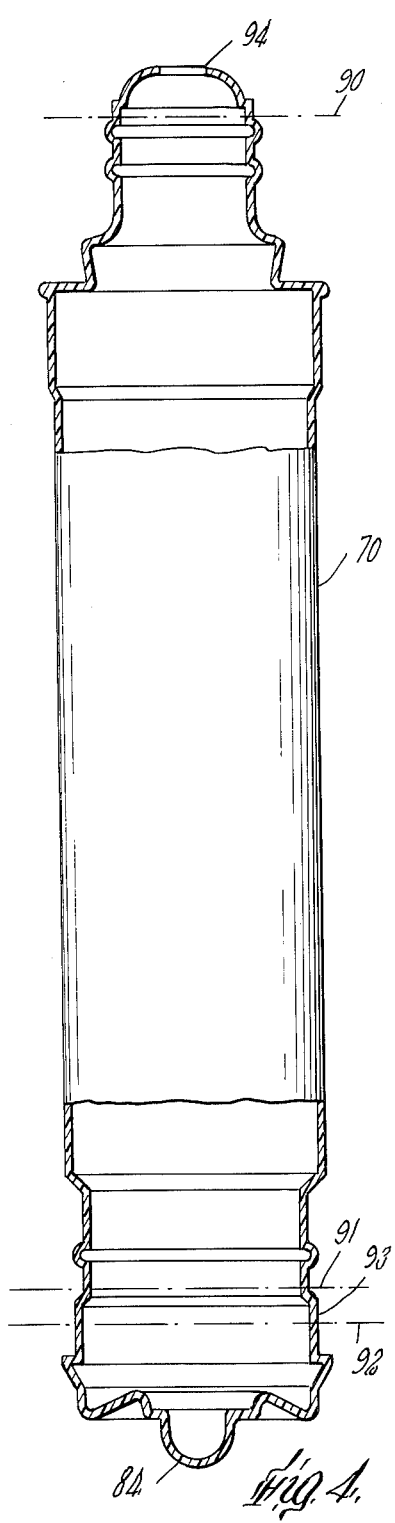
FIG. 4 is a view partly in elevation and partly in vertical cross-section of one of the internal elements at an intermediate stage of manufacture.

In the drawings 10 indicates a transparent plastic container made, for example, from styrene acrylonitrile copolymer and having a slightly tapered shape from top to bottom. A central integral annular support 12 extends upwardly from the bottom of the container 10 forming a socket. On the upper side wall of the container, there is an O-ring retaining groove 14 and an external thread 16, which threads, along with O-ring 18 are adapted to receive in fluid-tight sealing engagement, an internally screw-threaded head or cap 20.

A series of vertical spaced ribs 22 are also provided on the outside of the container 10 to afford a good handgrip for tightening and loosening the container and cap 20 when assembling or disassembling the apparatus.

The cap 20 is likewise made of a plastic material, for example, an acetal resin, which is so molded as to include an upstanding transverse boss 24 whose walls form a threaded inlet bore 26 extending inwardly from the right end of the boss 24 as seen in FIG. 2 and communicating with an aperture 28 extending down through the bottom wall of the cap to provide an inlet into the container.

A similar outlet bore 30 extends inwardly from the other end of the boss 24 and communicates with an axial bore 32 extending down through the center of the cap and terminating at an aperture formed by a diverging annular supporting wall 36 formed on the inside of a downwardly extending annular socket 40 integral with the remainder of the cap.

Pipes 42 and 44 are shown screwed into the threaded inlet and outlet bores respectively of the cap.

The internal filtration and purification assembly includes a filtration element 50 which may be any type of cylindrical filter element but is preferably a sleeve consisting of fibrous material such as cotton or other roving wound in precise geometrical pattern, such as a square or rhombus, in single or multiple layers, over a supporting porous or perforated thin wall inner cylinder 54 which may be a perforated thin-walled plastic tube. Such elements are well known in the art and are of the type shown for example in U.S. Patent No. 1,958,268.

For the purposes of this invention, however, the bottom of the element 50 is provided with an imperforate impervious plate or dic 60 which is adhesively sealed to the bottom annular end wall of the element 50 to close the bottom of internal bore of the element 50 against escape of fluid.

As shown in FIG. 2, this bottom wall 60 has a configuration which includes an annular groove 62 surrounding a centrally disposed dome 64, the dimensions of which are such that the dome 64 is received within the annular supporting means 12 of the outside container 10 in order to retain the bottom of the element 50 in slightly spaced relation from the walls of the outside container 10, as shown, but the dome 64 is rotatable relative to the support for a purpose to be later described.

The upper end of the element 50 carries an adhesively secured annular gasket 66 made of rubber, synthetic rubber or other suitable gasket material, and having a slightly less inner diameter than the inner diameter of the perforated supporting tube 54.

Telescoped within the element 50 is the tube or bottle 70 for containing a purification medium. This is a hollow plastic tube which may be made of polyethylene (as by a blow molding) and has a particular configuration for insuring the proper positioning and sealing of the internal components of the filtration apparatus. Thus, the upper end of the tube 70 has an O-ring retaining groove 72 adapted to receive and retain an O-ring 74 for making a pressure seal with the internal wall of the socket 40 of cap 20 when the tube is telescoped within the socket until the tube engages the end wall of the socket 40 at annular bead 73.

The tube 70, below 73 then decreases gradually in diameter downwardly to provide a reverse slope section 75 which is adapted to receive and retain a circular wire screen 76 with an adjacent underlying filter paper 77; and then increases in diameter to form annular bead 78, the underside of which abuts against the gasket 66 on the element 50 and forms a fluid tight seal between the elements 70 and 50 at this point, for which purpose the element 70 continues downwardly at a tight fit outer diameter until it merges into the major wall portion 79 which is of slightly reduced diameter in order to form an annular channel 80 between the inside of the perforated tube 54 and the outside of the impervious wall 79 of tube 70.

The bottom end of the tube 70 is so shaped as to provide an external annular detent 81 over which is snapped a cap 82 having a cooperating internal groove 83.

The cap 82 is provided with a dome 84 which is so dimensioned as to be received in nesting relation within the dome 64 of the bottom wall 60 of the element 50. This dome arrangement is such that the tube 70 may be rotated into a tight fit relation as it is telescoped into the element 50 with the inner tube bead 78 being brought into tight engagement with the gasket 66, and then both elements can rotate about the container socket 12 as the cap engages them when the upper bead 78 touches the cap socket 40, as the container 10 is screwed into the cap 20.

Surrounding the dome 84, the cap 82 is provided with a series of perforations 85.

The cap 82 and the bottom end of the tube 70 are also so proportioned with respect to the placement of the detent 81 that the cap and walls during assembly may clamp therebetween the flanged ends of a wire screen 86 over which has been placed another filter paper 87 which is held in place when the entire tube 70 between the two filter papers 77 and 87 is filled with pulverulent purification medium as is contemplated.

In operation, therefore, when the apparatus is coupled to inflow and outflow pipes, it can be seen that a fluid under pressure can be introduced through the inlet pipe 42 so that it flows into the container radially outwardly of the centered filter assembly and passes radially inwardly through the filtering medium of element 50 with a pressure drop into the internal annular passage 80 between the two tubes, flows downwardly but is contained by the bottom wall 60 of the outer element and then flows upwardly through apertures 85 in the inner tube cap 82, through the screen and filter paper and percolates up through the pulverulent purification medium, through the top filter paper 77 and screen 76 and is discharged through the outlet pipe 44.

As can be seen therefore with this structure all of the fluid flows through the entire depth of the pulverulent purification medium because of the vertical diversion of flow caused by the interposition of the impervious wall 79 of the inner tube. The resulting length of contact of the fluid with the purification medium provides effective purification of all the fluid flow.

As further can be seen, when either the inner tube 70 or the outer tube 50 needs to be replaced because of contamination, loading or other life limiting deterioration, the container may be readily unscrewed from the cap 20, during which disassembly the entire internal assembly will remain with the cap, because of the fit at the top provided by the O-ring 74, whereas the assembly is in no way attached to support 12. The tube 70 may then be parted from the cap 20, whereupon the element 50 may then be telescopically withdrawn upwardly away from the inner tube. Either the entire element 50 (with gasket 66 and bottom wall 60, may then be replaced, or the entire separate individual inner plastic tube may be replaced, or the latter may be emptied of its contained purification medium by removal of the bottom cap 82 and screen 86 and filter paper 87, and refilled. In any case, the apparatus then may be readily reassembled to the form shown in FIGS. 1 and 2, even when the cap is permanently affixed to some support through pipes 42 or 44 or otherwise, permitting the unscrewing and withdrawal of the container 10 downwardly from the cap.

Instead of the wire screens 76 and 86 with adjacent filter papers 77 and 87, it is contemplated that other similar porous retaining means may be used, e.g. plastic foam, or fibrous filter pads depending upon the particular size of the granules making up the pulverulent purifying medium which is to be retained in the tube 70.

Figure 5:
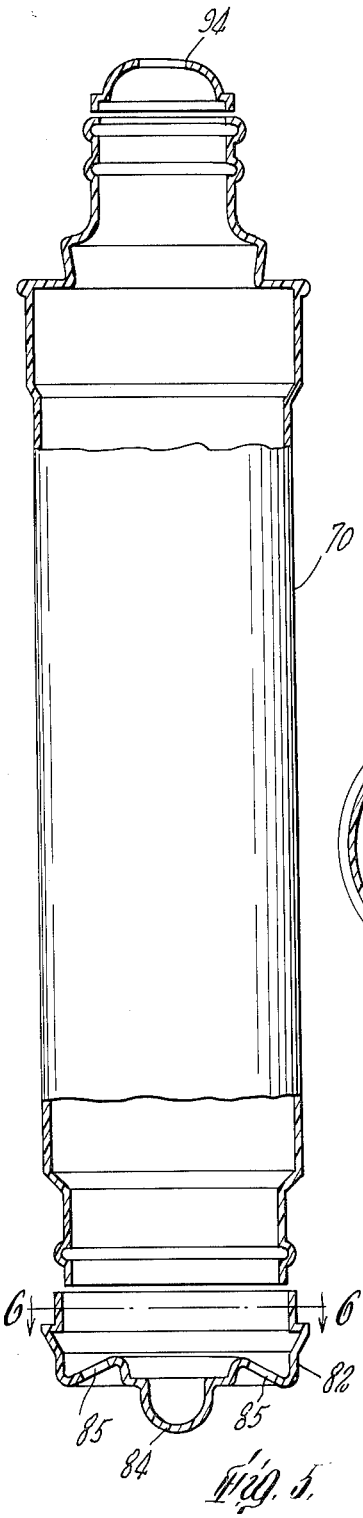
FIG. 5 is a similar but exploded view of the same element at a later stage of manufacture.
Figure 6:
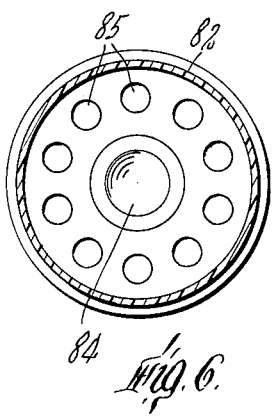
FIG. 6 is a cross-sectional view taken along the line 6—6 of FIG. 5.

FIGS. 4 and 5 illustrate a preferred method for constructing the inner tube 70. FIG. 4 shows the tube at an intermediate stage of manufacture just after it has been blown in a hollow mold by the well known polyethylene bottle blow method. The tube as thus formed in a closed mold has a closed bottom end, as shown, with an imperforate bottom integral end wall; and the top of the element contains a smaller aperture than that desired in the final inner tube element. Accordingly the tube as shown in FIG. 4 is transversely severed along lines of cut indicated at the top by the dotted line 90 and in two places at the bottom as indicated by the spaced dotted lines 91 and 92. The piece of material 93 intervening the two bottom cuts is then thrown away with the result that the dimensions of the detached bottom piece are those required for the cap 82 as shown in FIG. 5, ready for snap assembly over the bottom end of the severed tube 70. Before or, and preferably, after the severing of cap 82, it is punched to form the perforations 85 (see FIG. 6).

Likewise the piece removed by the cut at the top 94 is thrown away as waste.

This particular method for the production of the capped inner tube forms no part of the invention claimed in this application, but does comprise the invention of one of the applicants of the present application and hence is being claimed in a separate application filed by him as a sole inventor Serial No. 256,275, filed simultaneously herewith and now abandoned.

What is claimed is:

A filter comprising four separable units including top and bottom separable units forming a hollow container, opposed aligned central sockets on the inside of said container top and bottom units, a filtering assembly supported within said container between said sockets in spaced relation to the inside vertical wall of said container, said filtering assembly including a separable outer filter sleeve and an inner tubular filter unit, said sleeve having an open top end, a pervious cylindrical wall covered on the outside by a filter medium, and an impervious bottom wall, said inner unit having a bottle-like shape and having a fluid purification medium packed therein between two screens and having an imperforate longitudinally extending wall telescoped with a sealing friction fit within said sleeve and having a top wall extending above said sleeve and terminating in a sealing friction fit with the top of said top unit central socket, said top wall having upper and lower spaced annular external beads, said lower bead being in contact with the upper portion of said sleeve and said upper bead being in contact with the bottom part of said top unit central socket, and having a separable bottom wall containing a series of apertures surrounding its center, a major portion of said pervious wall and the longitudinally extending wall of said inner unit being radially spaced to form an intermediate annular channel for axial flow of fluid, said bottom walls of said telescoped units being axially spaced from one another by means of nested domes seated in said bottom socket.

(References on following page)

References Cited by the Examiner

UNITED STATES PATENTS

| | | | |
|---|---|---|---|
| 143,676 | 10/1873 | Demailly | 210—315 |
| 664,280 | 12/1900 | Leland | 210—445 |
| 999,759 | 8/1911 | Dondey et al. | 210—315 |
| 1,958,268 | 5/1934 | Goldman | 210—457 |
| 2,103,434 | 12/1937 | Pennebaker | 210—284 X |
| 2,230,883 | 2/1941 | Glass | 210—457 |
| 2,348,247 | 5/1944 | Dushane | 210—440 X |
| 2,431,782 | 12/1947 | Walton et al. | 210—440 X |
| 2,595,913 | 5/1952 | Baily | 210—315 X |
| 2,833,415 | 5/1958 | Wilkinson | 210—440 X |
| 2,966,990 | 1/1961 | Sicard | 210—443 |
| 3,000,505 | 9/1961 | Scavuzzo | 210—444 X |
| 3,062,377 | 11/1962 | Howard et al. | 210—315 |

REUBEN FRIEDMAN, *Primary Examiner.*

F. SPEAR, K. V. ROCKEY, *Assistant Examiners.*